(12) United States Patent
Drvar (10) Patent No.: US 10,495,037 B2
(45) Date of Patent: Dec. 3, 2019

(54) DEVICE FOR LOWERING THE POUR POINT OF CRUDE OIL OR HEAVY FUEL OIL

(71) Applicant: Antun Drvar, Nedelišće (HR)

(72) Inventor: Antun Drvar, Nedelišće (HR)

( * ) Notice: Subject to any disclaimer, the term of this patent is extended or adjusted under 35 U.S.C. 154(b) by 0 days.

(21) Appl. No.: 15/513,000

(22) PCT Filed: Sep. 24, 2015

(86) PCT No.: PCT/HR2015/000017
§ 371 (c)(1),
(2) Date: Mar. 21, 2017

(87) PCT Pub. No.: WO2016/046578
PCT Pub. Date: Mar. 31, 2016

(65) Prior Publication Data
US 2017/0292478 A1 Oct. 12, 2017

(30) Foreign Application Priority Data
Sep. 25, 2014 (HR) .............................. P 20140917 A (51) Int. Cl.
*C10G 32/02* (2006.01)
*C22C 1/00* (2006.01)
(Continued)

(52) U.S. Cl.
CPC .............. *F02M 27/04* (2013.01); *B01J 16/00* (2013.01); *B01J 19/0006* (2013.01);
(Continued)

(58) Field of Classification Search
CPC .................................. C10G 32/02; C22C 1/00
See application file for complete search history.

(56) References Cited

U.S. PATENT DOCUMENTS

| 4,429,665 A | 2/1984 | Brown |
| 4,715,325 A | 12/1987 | Walker |

(Continued)

OTHER PUBLICATIONS

International Search Report issued in PCT/HR2015/000017 dated Feb. 12, 2016, 6 pages.

(Continued)

*Primary Examiner* — Ellen M McAvoy
*Assistant Examiner* — Ming Cheung Po
(74) *Attorney, Agent, or Firm* — RatnerPrestia (57) ABSTRACT

A device for treating crude oil or heavy fuel oil with a method that can lower the pour point to at least 0° C. Crude oil or heavy fuel oil treated thusly maintains this property for at least one year. The device for lowering the pour point of crude oil or heavy fuel oil uses a specific ionization method. The method is conducted by passing a heated medium through the main ionization device which is grounded and which includes three parallelly connected segments whereby each segment includes a protective copper tube inside which a protective insulating shell is situated, inside which a copper housing is situated. In each copper housing there is one cylindrical-shaped external core in which an internal core is placed, and the external core and internal core are manufactured as two different alloys by composition. Also described is a process for casting the external core and internal core.

14 Claims, 11 Drawing Sheets

(51) Int. Cl.
| | |
|---|---|
| *F02M 27/04* | (2006.01) |
| *B01J 16/00* | (2006.01) |
| *B01J 19/00* | (2006.01) |
| *B01J 19/24* | (2006.01) |
| *C22F 1/08* | (2006.01) |
| *F02M 37/00* | (2006.01) |
| *C22C 1/02* | (2006.01) |
| *C22C 9/04* | (2006.01) |

(52) U.S. Cl.
CPC ........... *B01J 19/006* (2013.01); *B01J 19/242* (2013.01); *B01J 19/2405* (2013.01); *C10G 32/02* (2013.01); *C22C 1/02* (2013.01); *C22C 9/04* (2013.01); *C22F 1/08* (2013.01); *F02M 37/0064* (2013.01); *B01J 2219/00063* (2013.01); *B01J 2219/00065* (2013.01); *B01J 2219/00069* (2013.01); *B01J 2219/00162* (2013.01); *B01J 2219/00164* (2013.01); *B01J 2219/00772* (2013.01); *C10G 2300/304* (2013.01)

(56) References Cited

U.S. PATENT DOCUMENTS

| | | | | |
|---|---|---|---|---|
| 4,930,483 | A | * | 6/1990 | Jones ..................... F02M 27/02 123/538 |
| 5,044,347 | A | * | 9/1991 | Ullrich .................. F02M 33/00 123/536 |
| 5,048,499 | A | * | 9/1991 | Daywalt ................ F02M 27/00 123/1 A |
| 5,167,782 | A | | 12/1992 | Marlow |
| 5,938,864 | A | | 8/1999 | Tomikawa et al. |
| 6,165,246 | A | | 12/2000 | Kira et al. |
| 2011/0030636 | A1 | | 2/2011 | Detore |

OTHER PUBLICATIONS

Written Opinion of the International Search Authority issued in PCT/HR2015/000017 dated Feb. 12, 2016, 8 pages.

\* cited by examiner

DEVICE FOR LOWERING THE POUR POINT OF CRUDE OIL OR HEAVY FUEL OIL

CROSS REFERENCE TO RELATED APPLICATIONS

This application is the U.S. National Phase Application of PCT/HR2015/000017, filed Sep. 24, 2015, which claims priority to Croatian Patent Application No. P20140917A, filed Sep. 25, 2014, the contents of such applications being incorporated by reference herein.

THE FIELD PERTAINING TO THE INVENTION

The present invention relates to a device for the treatment of crude oil or heavy fuel oil, whereby physical and structural changes occur in crude oil, heavy fuel oil or bunker fuel treated thusly. Specifically, the pour point of treated crude oil, heavy fuel oil or bunker fuel is lowered to at least 0° C. or lower, if necessary, without the addition of any chemical additives.

TECHNICAL PROBLEM

The problem that arises during extraction, transport and exploitation of heavier types of crude oil, heavy fuel oils and bunker fuel is that both products have a relatively high pour point—in their crude state and under standard conditions, without the addition of pour point depressing chemicals, such oils solidify at temperatures of approximately 36° C. or somewhat lower. The problem that arises with crude oil or heavy fuel oil lies in the aromatics found within them, which have a tendency of electrostatic attraction, referred to as "pi pi stacking". Due to the planarity of the aromatic rings, non-covalent interactions are formed between them. Due to this, it is necessary to add various chemical additives to crude oil for the purpose of lowering the pour point of crude oil after extraction from the oil well and prior to transport through pipelines or by tankers because solid crude oil is not transportable. These additives cause the pour point of crude oil to lower, while the pour point of heavy fuel oil and bunker fuel is lowered by constant heating. With the present invention, a device for ionization and treatment of crude oil or heavy fuel oil, the pour point is lowered with the mere passage of crude oil or heavy fuel oil through the ionization device, and the lowering of the pour point of treated crude oil or heavy fuel oil to at least 0° C. or lower, if necessary, is achieved, without the addition of any additives. Also, when crude oil or heavy fuel oil is heated and treated by ionization with the device according to this invention, chemical changes in the crude oil or heavy fuel oil do not occur, and it is not necessary to introduce any other type of energy nor is it necessary to add any type of chemicals or additives to cause the lowering of the pour point.

STATE OF THE ART

Attempts have been made to separate and remove impurities from crude oil and other types of fluids for the purpose of improving the characteristics of fuel combustion, but until now, no one has succeeded in improving the fluidity of crude oil or heavy fuel oil at low temperatures using a specific method of ionization as that which is in accordance with this invention. Due to this, chemicals or heating procedures are exclusively used for lowering the pour point of crude oil or heavy fuel oil in current transport and storage procedures, which inevitably results in larger costs due to the consumption of additional energy, i.e. the consumption of considerable resources on chemicals that are pumped into crude oil, whereby it is necessary to subsequently remove the stated chemicals from the crude oil prior to the refining process, which additionally raises the cost of the entire procedure. Because of this, the procedure according to this invention contributes to protecting the environment by lowering, i.e., by completely eliminating the use of additives in crude oil.

The use of this device according to the present invention envisages that the ionization of crude oil or heavy fuel oil is conducted immediately upon its extraction. Namely, during its extraction from an oil well, crude oil is already heated, and as such, with a suitable increase of pressure and at the appropriate temperature, is passed through the ionization device, which consists of 3 parallelly connected ionization segments 85. The pressure upon entry of the liquid crude oil or heavy fuel oil is at least 25 bars, and optimal ionization is achieved at a temperature of 90° C. and at a pressure of 25 bars. In that manner, when crude oil or heavy fuel oil passes through the ionization device, the pour point is lowered to the temperature of 0° C. or lower, if necessary (with the use of an additional series of connected ionization devices). Crude oil or heavy fuel oil retains the stated lowered pour point at least one year upon using the aforementioned process, which resolves the main problem presented before the present invention, and it is not necessary to add any chemical additives for the purpose of lowering the pour point. Crude oil or heavy fuel oil treated thusly does not change its chemical properties and the usual transportation and further refining procedures are conducted with such crude oil or heavy fuel oil.

DISCLOSURE OF THE INVENTION

An aspect of the present invention is to construct such a device with an external and internal ionization core that will lower the pour point of crude oil or heavy fuel oil to 0° C. or lower, if necessary, by using a specific ionization method, whereby the crude oil or heavy fuel oil treated in such a method must remain in a liquid state for at least one year. The external and internal cores of one ionization segment 85 have appropriate chemical compositions and have been manufactured in the manner that maximum friction between the fluid and the cores occurs while passage of the fluid between the cores; while this passage the said ionization is conducted, which means the pour point of the fluid has been lowered.

The secondary aspect of the present invention is the construction of a device that does not create any chemical process in the composition of crude oil or heavy fuel oil, nor that any chemicals or additional energy for heating receptacles or transport pipelines are used in order to lower the pour point of said crude oil or heavy fuel oil.

An additional aspect of the present invention is to ensure the manufacturing process whereby the external and internal cores are cast in accordance with the necessary and appropriate composition of alloys, which are stated hereinafter. It is also necessary to ensure that the manufacturing process results in exceptionally high-quality external and internal cores, which do not require any maintenance during a 10-year period.

The principle of operation of ionization in the present invention is based on the passage of a fluid through a core, which achieves maximum friction upon the surface of the cores (the cores being placed one inside the other), and ionization occurs while passage through the cores. The internal and external cores are alloys by composition and are cast from many different metals. The method is based on a foundation of selected alloys so that the passage of media results in the friction of particles. Such a process results in the breakage of particles inside the crude oil/heavy fuel oil, which are responsible for creating a gel, in other words, the breakage of that which is referred to as conglomeration, which is of immense importance for the fluidity of crude oil or heavy fuel oil.

The composition of crude oil or heavy fuel oil contains 50 percent of aromatics and 50 percent of hydrocarbons. Aromatics found in standard, non-ionized crude oil or heavy fuel oil have an electrostatic attraction tendency, referred to as "pi-pi stacking". Due to the planarity of the aromatic rings, where all atoms of a molecule are situated in the same plane, aromatics are able to create non-covalent interactions between themselves. On the other hand, when crude oil or heavy fuel oil is heated and treated with ionization according to the present invention, the aromatics are not able to form an interaction suitable for "pi-pi stacking". Instead, a homogenous compound of aromatics and alkanes (paraffins) is formed. The structure of this compound of aromatics and alkanes is not stabilized with additional non-covalent bonds, which is the reason why ionized crude oil or heavy fuel oil remains in a liquid state at low temperatures. The purpose of the present invention is for it to be used directly on oil wells during the production and transport of crude oil or heavy fuel oil, in refineries for the production and transport of crude oil or heavy fuel oil, i.e. that it enables crude oil or heavy fuel oil to remain in a liquid state when stored.

The specific ionization technology described herein, which is intended for the treatment of crude oil or heavy fuel oil, lowers the pour point to 0° C. (under standard conditions), and the fluid treated thusly has the property of a lowered pour point for at least one year. The ionization of a medium can be executed only if the medium is liquid and if it can be transported by pumps through the ionization system. Therefore, it is necessary that the medium is heated to approximately 90° C. upon entry into the device. This is usually the case with direct extraction of crude oil from an oil well; when crude oil is already at a temperature of approximately 90° C., it is not necessary to consume additional energy for heating.

An aspect of the present invention being a device for the treatment of crude oil or heavy fuel oil using ionization is implemented with the assembly of ionization devices that is set up in a chamber that serves as a heating chamber, and which is heated to a maximum temperature of 160° C. internally. The heating chamber can be heated using electrical heaters, as is the case in the present invention, or it may be equipped with a gas heater; the heaters must always be sufficiently powerful to maintain the requested temperature. The inside of the chamber contains at least 6 primary grounded ionization devices 2 that are connected in a series.

Each individual ionization device 2 consists of 3 parallelly connected segments 85 where each segment 85 consists of a protective copper tube 49, inside which is situated a protective insulating shell 73, in which is situated a copper housing 71, and in each copper housing, one cylindrical-shaped external core 70 is situated, in which the internal core 69 is installed, and the mentioned external core 70 and internal core 69 are manufactured as two parts with compositions of different alloys.

Tests that have been conducted for many years have determined that in order to achieve a lowering of the pour point, it is absolutely necessary that the external core 70 and internal core 69 are manufactured as two parts with compositions of different alloys, so that the passage of a medium between them creates the desired ionization and lowering of the pour point. Namely, the use of different internal and external cores creates different resistance between the internal and external core through which the fluid passes. The cores consist of a combination of various metals in specific percentages, and the main components are copper, aluminum, tin, zinc, antimony, nickel, iron, gold and silver. It is necessary for the alloy of the internal core 69 to have the following composition:

| Component | by weight (%) |
|---|---|
| aluminum | 1.94 |
| copper OFHC99.92 | 54.00 |
| tin, 99.9% purity | 1.80 |
| zinc, 99.9% purity | 22.10 |
| antimony | 0.05 |
| iron | 0.08 |
| nickel | 11.74 |
| lead | 8.00 |
| gold | 0.05 |
| silver, 90% purity | 0.04 |
| tungsten | 0.01 |
| vanadium | 0.02 |
| phosphorus | 0.02 |
| sulfur | 0.02 |
| silicon | 0.06 |
| manganese | 0.04 |
| platinum | 0.03 |

It has also been determined that the alloy of the external core 70 must have the following composition:

| Component | by weight (%) |
|---|---|
| aluminum | 2.40 |
| copper OFHC99.92 | 52.73 |
| gold | 0.05 |
| antimony | 0.06 |
| zinc, 99.9% purity | 22.80 |
| silver | 0.04 |
| tin, 99.9% purity | 1.80 |
| chromium | 0.04 |
| nickel | 11.74 |
| cobalt | 0.05 |
| tungsten | 0.01 |
| vanadium | 0.02 |
| lead | 8.00 |
| iron | 0.08 |
| phosphorus | 0.05 |
| sulfur | 0.02 |
| manganese | 0.04 |
| silicon | 0.03 |
| platinum | 0.04 |

Lowering the pour point is possible to achieve using only the stated two external and internal cores that have exactly the above-mentioned compositions.

No chemical processes occur using this technology, no additives for lowering the pour point are used, and the property of lowering the pour point is achieved in one passage. The life span of the cores is 10 years of functionality without any maintenance. The flow is adapted and increased proportionally in all elements i.e. assemblies, whereby the cores themselves always maintain their constant length of 28.5 cm. Due to this, increasing the capacity of the device is only possible by proportionally increasing the cross section of the cores.

The external core 70 is cast as an elongated cylindrical object with a bore along its entire length, hemispherical protrusions 75 are situated along its inside rim in order to additionally increase the turbulence of the medium in the device and its friction upon the cores' surfaces. In its inside, the external core 70 has four main rows with 56 hemispherical protrusions 75 arranged at 90°. An additional row of 48 hemispherical protrusions is situated between every two of the stated four main rows; the first additional row is positioned at 45°, the second at 135°, the third at 225°, and the last additional row at 315°. The stated hemispherical protrusions likewise maintain a distance from the internal core 69. The hemispherical protrusions have a tortuous range of motion, and because of this they are able to force the fluid that is flowing onto a winding course and mix the medium using the highest possible friction and most contact with the internal core 69 and external core 70.

The internal core 69 is constructed as an elongated object that has a trapezoidal thread along its rim. The internal core 69 has a starting left trapezoidal thread, and after ¼ of the length of the core, it is converted to a right trapezoidal thread, which after ¾ of the length of the core once again coverts to a left trapezoidal thread, and at the final ¼, again converts to a right trapezoidal thread.

Conversely, an embodiment where the internal core 69 has a starting right trapezoidal thread is possible, which after ¼ of the length of the core converts to a left trapezoidal thread, which after ¾ of the length of the core once again coverts to a right trapezoidal thread, and at the final ¼, again converts to a left trapezoidal thread.

The method of manufacturing the internal core 69 of the ionization device comprises the following steps:
- a) Aluminum, cooper, tin, antimony and iron are placed in a mold in the percentages as stated above for the production of the internal core 69;
- b) Heating of the metals in the stated mold, and the mold is heated to a temperature of approximately 980 to 1200° C., until a molten compound of metals is obtained;
- c) The temperature is raised to 1425-1540° C., and nickel, lead, gold, silver, tungsten, vanadium, phosphorous, sulfur, silicon and manganese are added into the molten compound of metals in the percentages as stated above for the production of the internal core 69;
- d) The temperature of the molten compound of metals must remain at a temperature of at least approximately 1500° C. for at least 5 minutes, and at most for 10 minutes;
- e) Due to its low melting point, zinc is added 5 minutes before the molten compound of metals is cast in an appropriate mold;
- f) An appropriate amount of borax is then added into the molten compound of metals so that the impurities from the materials would rise to the surface, where they are physically removed;
- g) Casting into the molds then follows, and cooling of the cast compound to room temperature, upon which cleaning is performed as necessary, with mandatory sandblasting of the cast elements;
- h) The core must then be rid of exterior unevenness;
- i) The internal core that has been processed thusly is again heated to approximately 200° C. and briefly immersed in molten platinum in order to create a thin film on the entire surface.

The method of manufacturing the external core 70 of the ionization device comprises the following steps:
- a) Aluminum, cooper, tin, antimony and iron are placed in a mold in the percentages as stated above for the production of the external core 70;
- b) Heating of the metals in the stated mold, and the mold is heated to a temperature of approximately 980 to 1200° C., until a molten compound of metals is obtained;
- c) The temperature is raised to 1425-1540° C., and nickel, lead, gold, silver, tungsten, vanadium, phosphorous, sulfur, chrome, cobalt, silicon and manganese are added into the molten compound of metals in the percentages as stated above for the production of the external core 70;
- d) The temperature of the molten compound of metals must remain at a temperature of at least approximately 1500° C. for at least 5 minutes, and at most for 10 minutes;
- e) Due to its low melting point, zinc is added 5 minutes before the molten compound of metals is cast in an appropriate mold;
- f) An appropriate amount of borax is then added into the molten compound of metals so that the impurities from the materials would rise to the surface, where they are physically removed;
- g) Casting into the molds then follows, and cooling of the cast compound to room temperature, upon which cleaning is performed as necessary, with mandatory sandblasting of the cast elements;
- h) The core must then be rid of exterior unevenness;
- i) The external core 70 that has been processed thusly is again heated to approximately 200° C. and briefly immersed in molten platinum in order to create a thin film on the entire surface.

During the above-mentioned casting procedures, the temperature is mainly the same for the production of the internal 69 and external 70 cores, and only the percentage of elements that are added in the mold are changed in accordance with the required percentages for manufacturing the internal and external cores.

To lower the pour point to 0° C., it is necessary to use at least 6 primary ionization devices 2 that are interconnected in a series, and then after passing through the device, the medium will maintain the property of a lowered temperature of its pour point at 0° C. under standard conditions for at least one year after executing the ionization process.

All six primary ionization devices are interconnected with ground potential by a wire, which is connected to the housing of the heating chamber 1 and ensures the proper operation of the device.

All separators as well as all other parts and joints must be made from copper.

BRIEF DESCRIPTION OF THE FIGURES

The supporting figures that are included in the description and form a constituent part of the description of the present invention, illustrate the previously examined best possible embodiment of the invention, and assist in the explanation of the basic principles of the invention.

FIG. 13a presents data regarding a simulated distillation of standard crude oil, while

FIG. 15a presents an H NMR spectrogram for standard crude oil while

DETAILED DESCRIPTION OF AT LEAST ONE IMPLEMENTATION OF THE INVENTION

Figure 1:
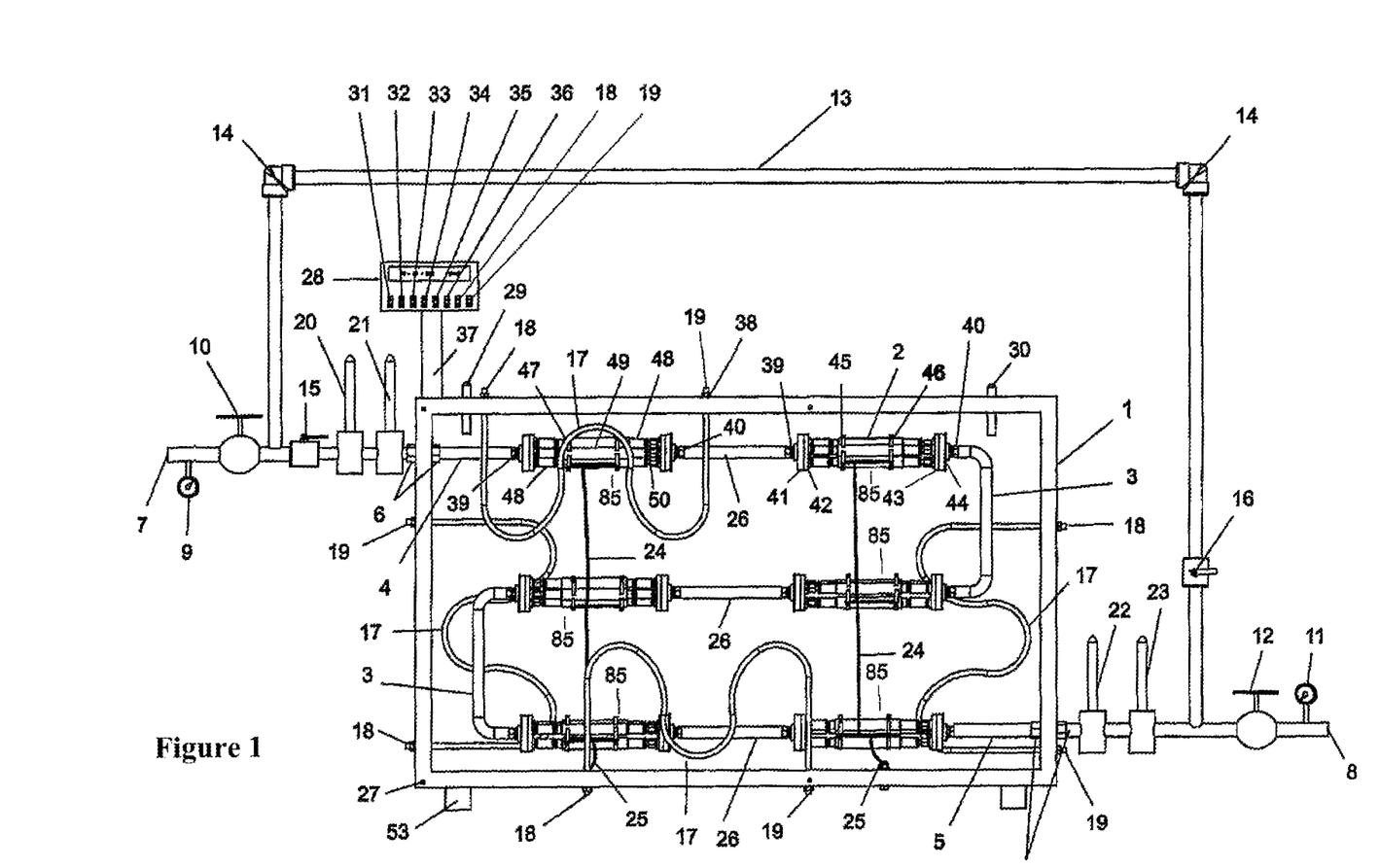
FIG. 1 presents a spatial view of the entire assembled ionization device according to an aspect of the present invention, which contains 6 ionization devices connected in a series within its housing.
Figure 2:
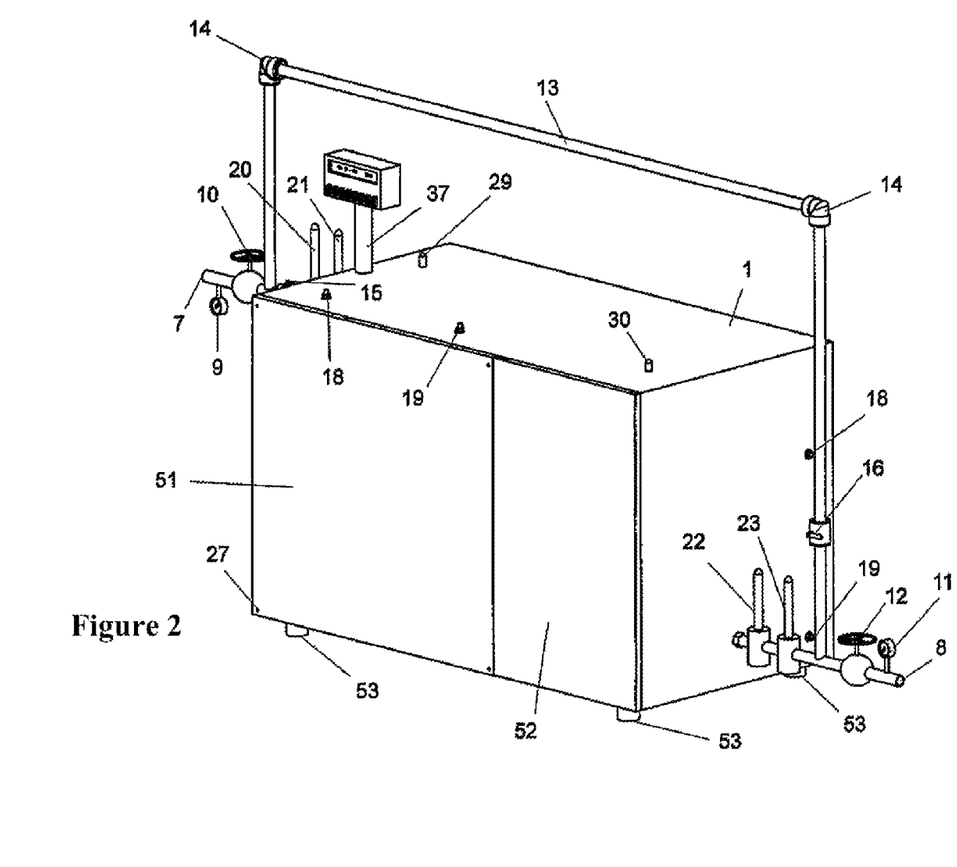
FIG. 2 presents a side view of the assembled device and the heating chamber with doors.

An aspect of the present invention regarding the device for the treatment of crude oil or heavy fuel oil with ionization is achieved with an assembly of an ionization device that is installed in a chamber 1 that serves as a heating chamber 1, which heats up the inside of its space up to a maximum of 160° C. Heating is achieved with the use of electric heaters 17 as stated in this present invention, but gas heaters can be used as well, given that the heaters must always provide sufficient power to maintain the desired temperature. FIGS. 1 and 2 show the heating chamber 1, where an inlet manometer 9 is built on the inlet tube 7 of the device, and an outlet manometer 11 is built on the outlet tube 8 of the device, whereby both manometers measure pressure. The pressure is regulated as necessary by using the inlet pressure regulator 10 and the outlet pressure regulator 12.

Furthermore, an inlet flow gauge 20 is built on the inlet tube 7. On the outlet tube 8, an outlet flow gauge 22 is built, which, as the inlet gauge, is connected to the controller 28, which automatically regulates the given flow.

For measuring the temperature of media (crude oil or heavy fuel oil), an inlet temperature gauge 21 is installed at the entrance, which measures the inlet temperature of the fluid, while an outlet temperature gauge 23 is installed at the exit, whereby both are connected to contacts 32 and 34 on the controller 28, which compares the temperature and as necessary, turns the heaters 17 on or off that heat the chamber 1 in which the assembly of the ionization device is located.

The assemblies of the ionization device are connected with the inlet tube 4 in a series, specifically, with two in three rows, and the same temperature that was present at the entrance is realized at the exit.

The temperature of the heating chamber 1 is maintained and monitored by two thermostats 29 and 30 located in the upper portion of the heating chamber 1, which are connected to the controller 28 at contacts 35 and 36.

All six main ionization devices 2 are interconnected with ground potential by a wire 24, which is connected with the housing of the heating chamber 1 and ensures the proper operation of the device.

The entire system is constructed so that it includes a bypass tube 13, where at the left side of the inlet tube 7, after the inlet pressure regulator 10, there is a vertically connected bypass tube 13, which is directly connected perpendicularly with two elbow joints 14 to the exit via the bypass valve 16, so that the process of transporting fluid does not stop in the event of malfunction, and that the necessary repairs can be made. The inlet valve 15 in such a case is closed, and the outlet valve 16 is opened.

The fluid that passes through the inlet tube 7 passes through the inlet tube of the device 4, connected to the outside and inside of the heating chamber 1 with a tube nut 6. The assembly of the main ionization device 2 is connected to the tube nut 6, i.e. two devices in three rows that are connected at their centers with a straight connecting tube 26, and connected with lateral U couplings 3 at their right and left sides. The end assembly of the main ionization device 2 is connected via the outlet tube of the device 5, and the fluid freely exits through the outlet tube 8.

The assemblies of the ionization device 2 are connected by wires 24 fitted with cable lugs 76, connected with three ground potential carrier screws 47, which tighten the exterior carrier of ground potential 46 and the main carrier of ground potential 45, between which three protective copper tubes 49 are located. In such a manner, all has been grounded and connected to the housing of the heating chamber 1 via a screw of ground potential 25. The electric heaters 17 in the heating chamber 1 are shaped like the letter M, whereby four of them are situated, two in the front and two in the back, in the heating chamber 1 with heater nuts 38. At their ends, neutral is brought to 18, and active to 19, and their operation is regulated by the controller 28, connected to the controller 28, through contacts 18 and 19.

The heating chamber 1 is set on four metal legs 53, and on its front side, a left door 51 and a right door 52 are fastened with door screws 27, which is best noted on FIG. 2. The doors serve as an entrance into the heating chamber 1 during maintenance or repairs.

Figure 3:
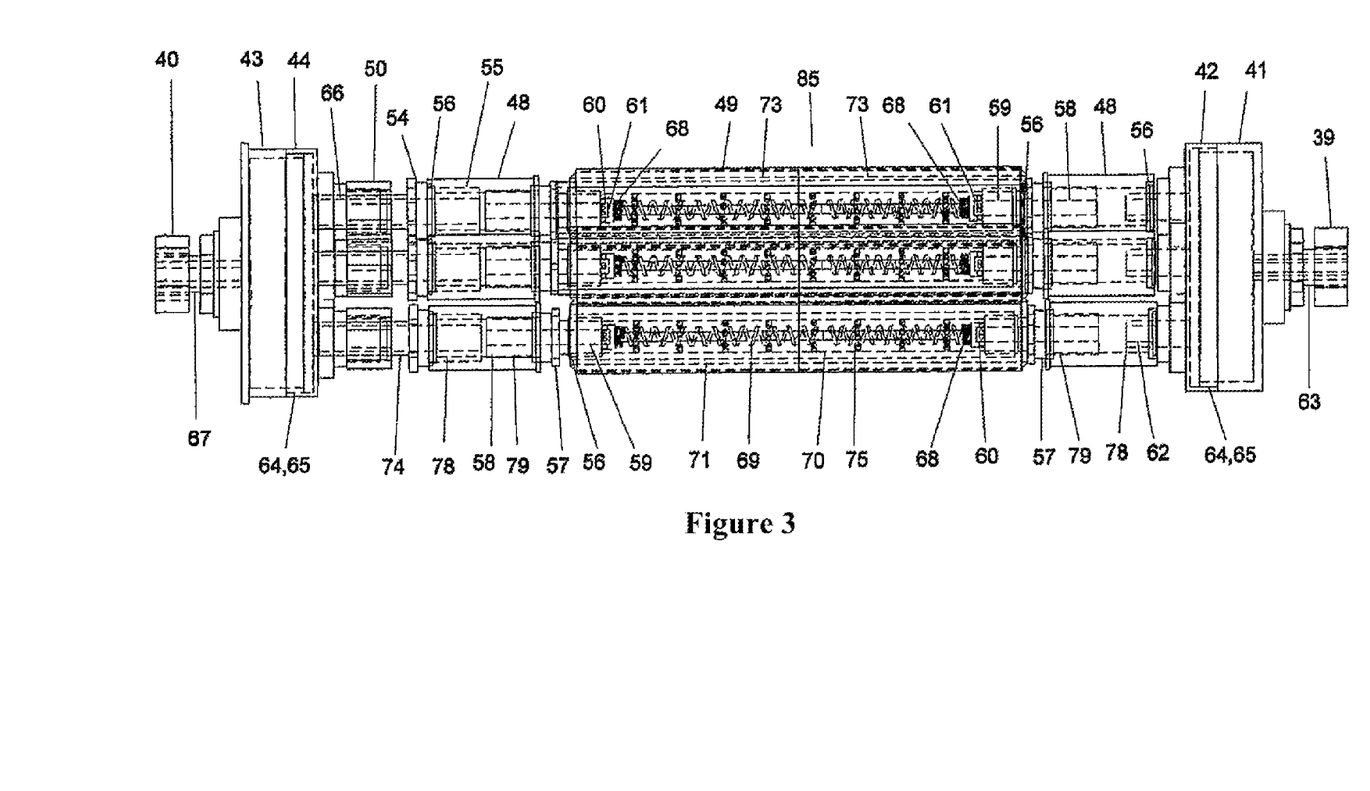
FIG. 3 presents a spatial view of the cross section of the assembled ionization device.
Figure 5:
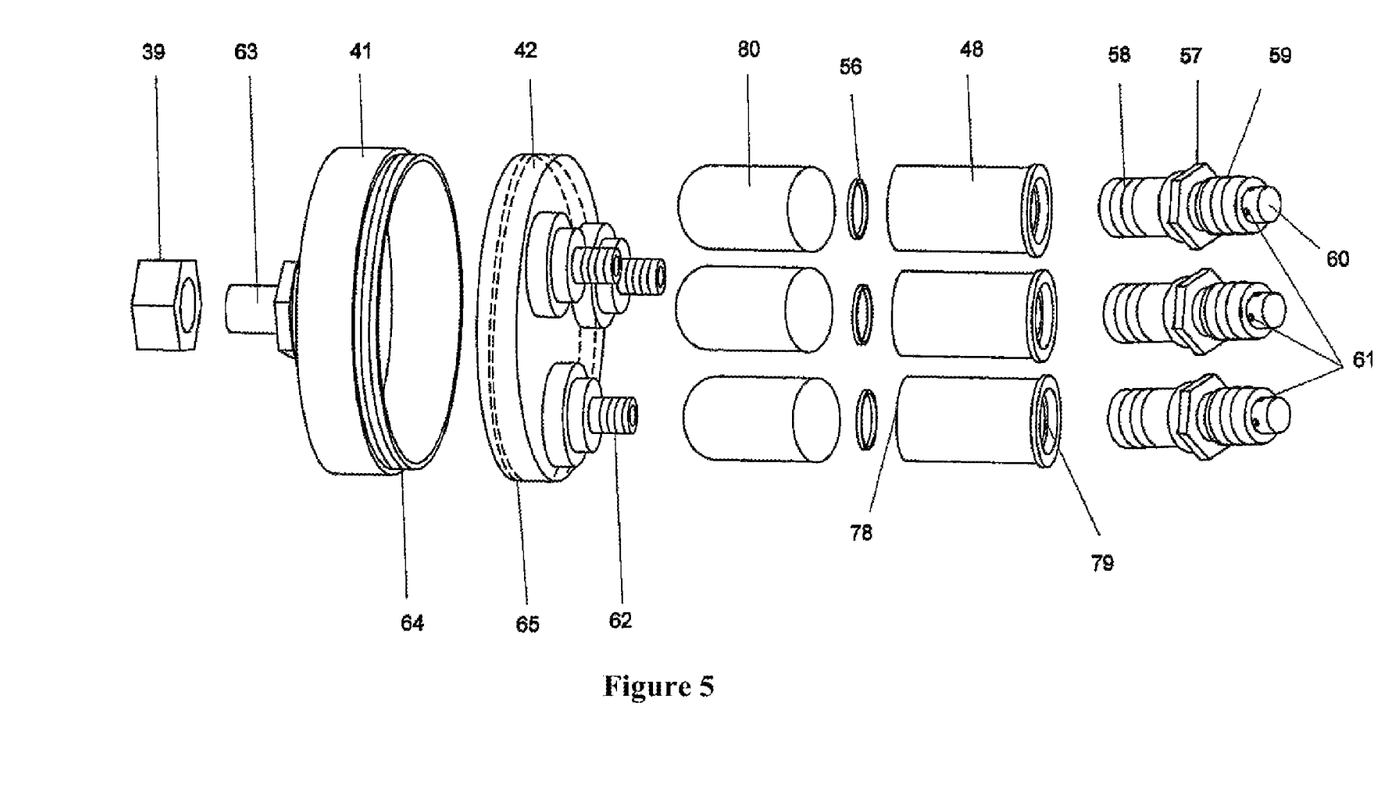
FIG. 5 presents a view of the left and right halves of the inlet portion of the separator and its joint elements.
Figure 6:
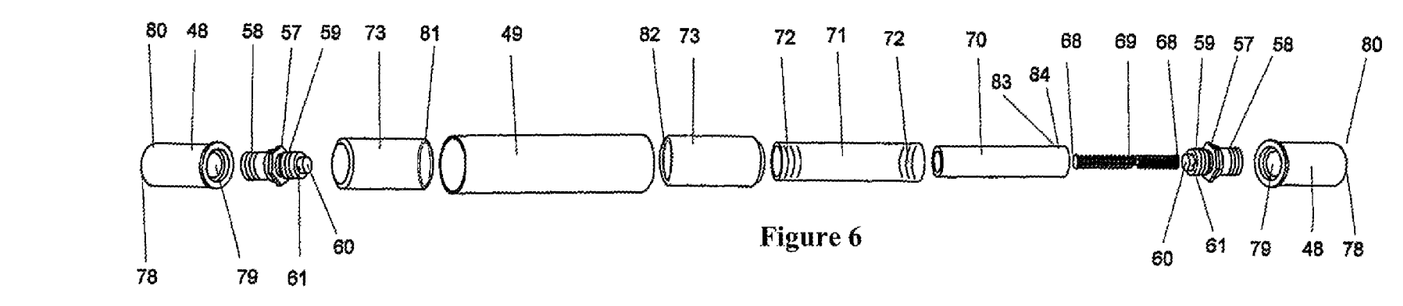
FIG. 6 presents a spatial view of the joint elements that connect with the insulator and form one ionization segment.
Figure 7:
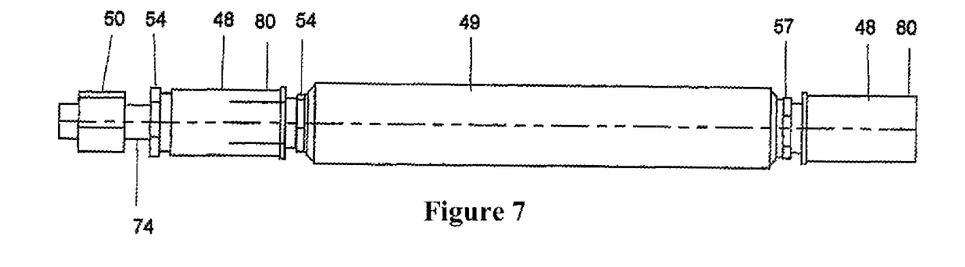
FIG. 7 presents assembled elements from FIG. 6 that form one ionization segment 85, which contains an external and internal core.

The assembly of the main ionization device 2 consists of an inlet separator, viewing from the left side as noted on FIGS. 3 and 5, which consists of two halves, namely the left half of the inlet separator 41, which has an outer thread of the half 64, and the right half of the inlet separator 42 with an inner thread on the half 65, which interconnect. The halves are hollowed to form a small reservoir. The left half of the inlet separator 41 includes at its center, a juncture of the left half 63 with the nut of the inlet tube of the device 39 with an inner thread on which fuel input is connected. The other side of the half contains three exists with a thread of the right half 62, a male thread on which one insulator 48 is fastened on each exit, each insulator being made of a polyamide with 50% fiberglass and pressed in a copper tube 80 from its outside in order to increase resistance to internal pressure. Between the insulator 48 and the thread of the right half 62, an O ring 56 is placed for improved sealing. The insulator 48 has an adequate female inner thread that is located on its the left 78 and right side 79, and which are connected with an open bore.

Figure 8:
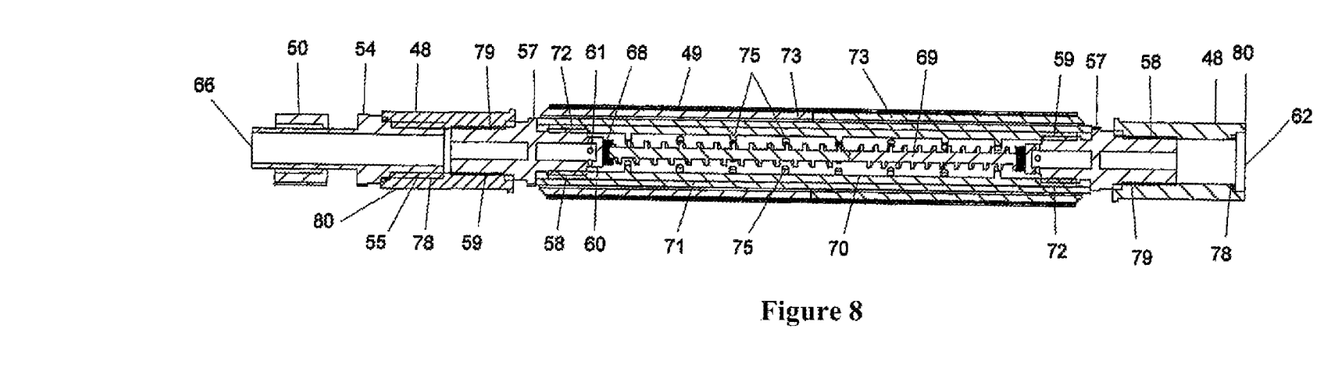
FIG. 8 presents connected elements that form one ionization segment 85, in its cross section.
Figure 9:
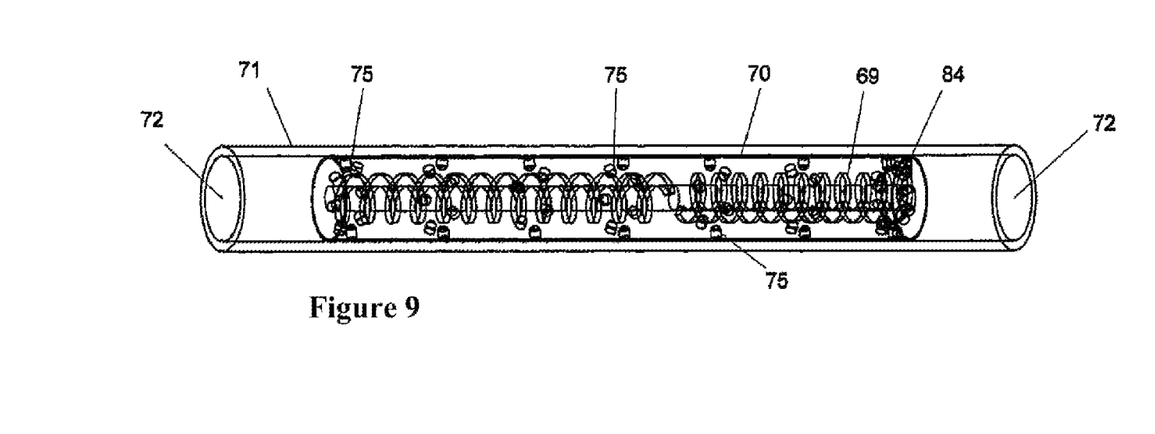
FIG. 9 presents the external core with threads and with ridged protrusions situated in the external tube of the connecting couplings.
Figure 10:
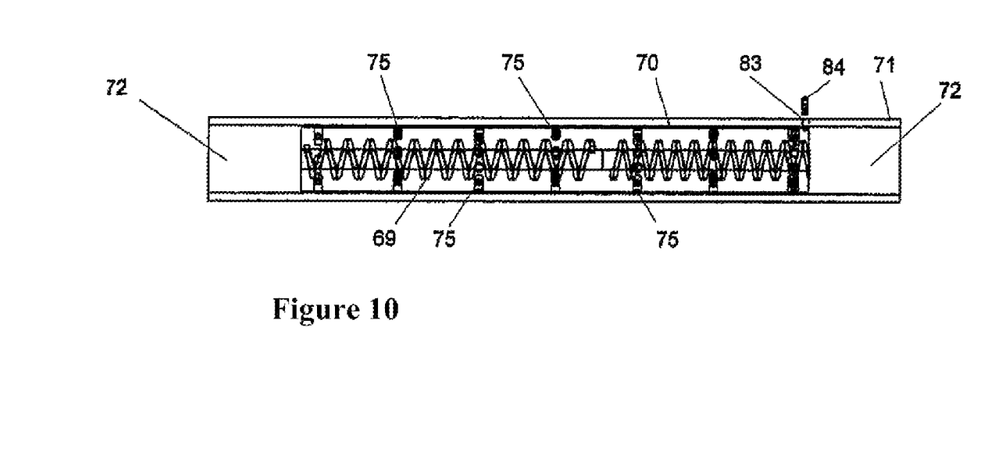
FIG. 10 presents a cross-sectional view of FIG. 9 and a view of screws for connecting the internal and external cores.
Figure 11:
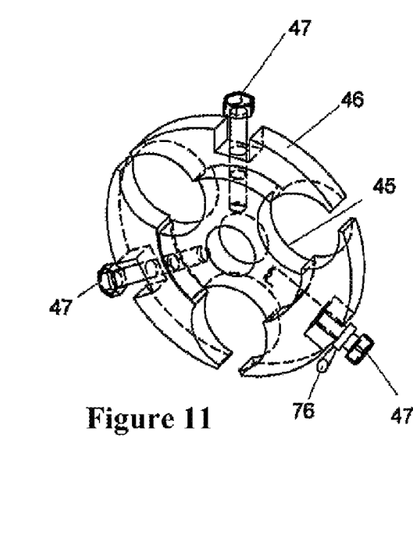
FIG. 11 presents the main and exterior carriers of ground potential that are tightened with screws and the cable lugs for achieving a connection with the wire.

On its left side, the insulator 48 has a flange 57 with an exterior male flange thread 58, and an inner hole running through the entire flange, which is secured into the insulator 48. The right portion of the flange 57 is manufactured in such a manner that it has an exterior male flange thread 59 with an elongated and enclosed body of the flange 60, a quadrilateral (circular) and enclosed face, and has on its side openings 61, and has an open canal through it used for connecting. A copper housing 71, which has a bore with inner male threads for the left 72 and right 72 sides, is fastened to the flange, and the open bore serves as a carrier for the cores. On its outside, the copper housing 71 has two insulating shells 73, left and right (FIGS. 3, 6, 7 and 8), which cover the entire outer copper housing and are produced with an outer tooth 82 and an inner tooth 81 at one end. A protective copper tube 49 is pulled over the plastic shells 73, which are of the same composition as the insulator 48. Two cores, which must be exactly 28.5 cm in length, are situated in the copper housing 71 (FIGS. 8, 9 and 10).

The external core 70 is cast as an elongated cylindrical object with a bore through its entire length, and in its inside rim, hemispherical protrusions 75 are situated. The diameter of the external core 70 is the same as the diameter of the copper housing 71. On the inner rim of its cylinder, the external core 70 has four main rows of 56 hemispherical protrusions 75 arranged at 90°. An additional row of 48 hemispherical protrusions is situated between every two of the stated four primary rows; the first additional row is positioned at 45°, the second at 135°, the third at 225°, and the last additional row at 315°. The stated hemispherical protrusions likewise maintain a distance from the internal core 69. The hemispherical protrusions have a tortuous range of motion, and because of this are able to force the fluid that is flowing onto a winding course and mix the medium using the highest possible friction and most contact with the internal core 69 and external core 70.

In the inner space of the external core 70, the internal core 69 is situated, which is constructed in the shape of trapezoidal thread. The internal core 69 has a starting left trapezoidal thread, and after ¼ of the length of the core, it is converted to a right trapezoidal thread, which after ⅔ of the length of the core once again coverts to a left trapezoidal thread, and at the final ¼, again converts to a right trapezoidal thread. The external core 70 and the internal core 69 are interconnected through an opening 83 with a screw 84.

The internal core 69 is situated in the copper housing 71 and has direct contact with the face 60 via the spring 68. The right side of the core is secured using a male flange 57, which is screwed onto the copper housing 71 using the exterior male flange thread 59 and secures the external core using its elongated extension 60 and spring 68.

Figure 4:
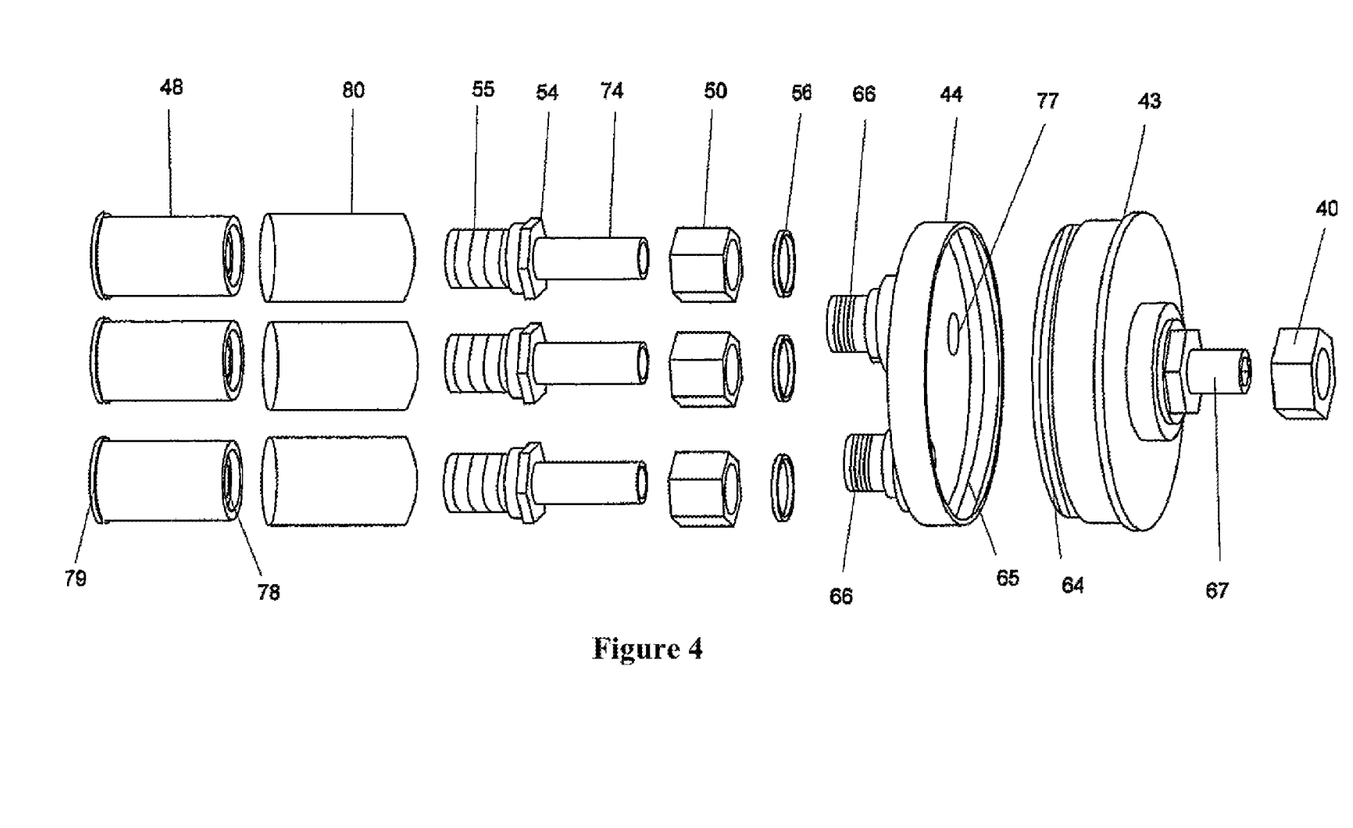
FIG. 4 presents a view of the left and right halves of the outlet portion of the separator and its joint elements.

On the right side of the insulator 48, FIGS. 3 and 4, a coupling 54 is fastened, which has a male thread 55 on its left side, and an elongated coupling tube 74 on its right side, which comprises an O ring 56 and a nut 50, which is fastened to the thread of the left half of the outlet separator 66. The outlet separator 66 has three openings 77 in its inside. The right half of the outlet separator 44 is identical to the left half of the inlet separator 41, which embodies the juncture of the right half of the outlet separator 67 with the outer thread of the half 64 for a connection with the left half.

Figure 12:
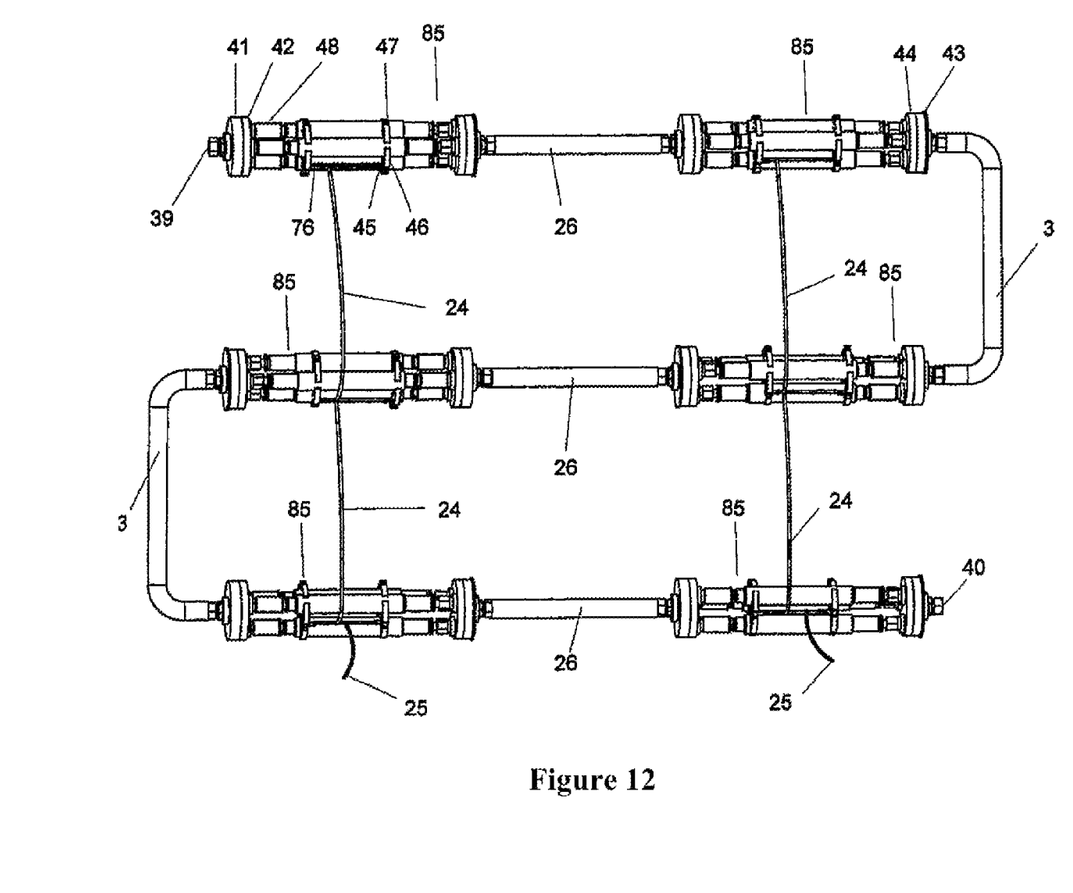
FIG. 12 presents the spatial view of 6 serially connected ionization devices, connected with straight connecting tubes to carriers of ground potential and to ground potential.

The nut of the outlet tube of the device 40 serves as a connector to the next assembly of the ionization device 2. A total of six devices with three passages (FIG. 12) must be in a set. At the entrance of the separator of the first device, an inlet pressure regulator 10 is affixed, while at the exit of the right half of the separator of the sixth main ionization device 2, an outlet pressure regulator 12 is affixed.

The heating chamber 1 must always have enough power to maintain the temperature in the range of 160° C. To achieve liquid fuel, the inlet pressure must be a minimum of 25 bars, while optimal ionization takes place at 90° C. and 25 bars of pressure. If work must be performed at lower temperatures, for each 10° C., the ionization assembly must be extended by one device; for example, if the inlet temperature is 80° C., then the line has 7 main ionization devices 2, and the pressure is raised by 2 bars using pressure regulators for each 10° C. temperature drop and must then be 27 bars, for a temperature of 70° C. the pressure must be 29 bars, at 60° C. the pressure must be 31 bars and at 50° C. the pressure must be 33 bars. At 40° C., ionization can only take place if the medium is in a liquid state and if pumps are able to transport it through the ionization system.

Tests and Results

The testing of samples has been conducted in the Central Testing Laboratory of the company INA Inc. The pour point testing included a sample of crude oil, a sample of ionized crude oil that passed through the above-described device, a sample of heavy fuel oil, and a sample of ionized heavy fuel oil upon its passage through the device. The testing of samples of standard crude oil and ionized crude oil using gas chromatography and using nuclear magnetic spectroscopy has also been conducted.

Pour point testing conducted on samples of crude oil and heavy fuel oil provided the following results:

| Sample | Property | Unit of measurement | Measurement result | Measurement method |
|---|---|---|---|---|
| Crude oil - standard | Pour point | ° C. | 30 | ASTM D 5950:2014 |
| Crude oil - ionized | Pour point | ° C. | 0 | ASTM D 5950:2014 |
| Heavy fuel oil - standard | Pour point | ° C. | 30 | ASTM D 5950:2014 |
| Heavy fuel oil - ionized | Pour point | ° C. | 0 | ASTM D 5950:2014 |

Testing samples using gas chromatography provided data of a simulated distillation, while chromatograms were used to explain the structure of samples that directly affects the above-mentioned altered pour point.

Figure 13A:
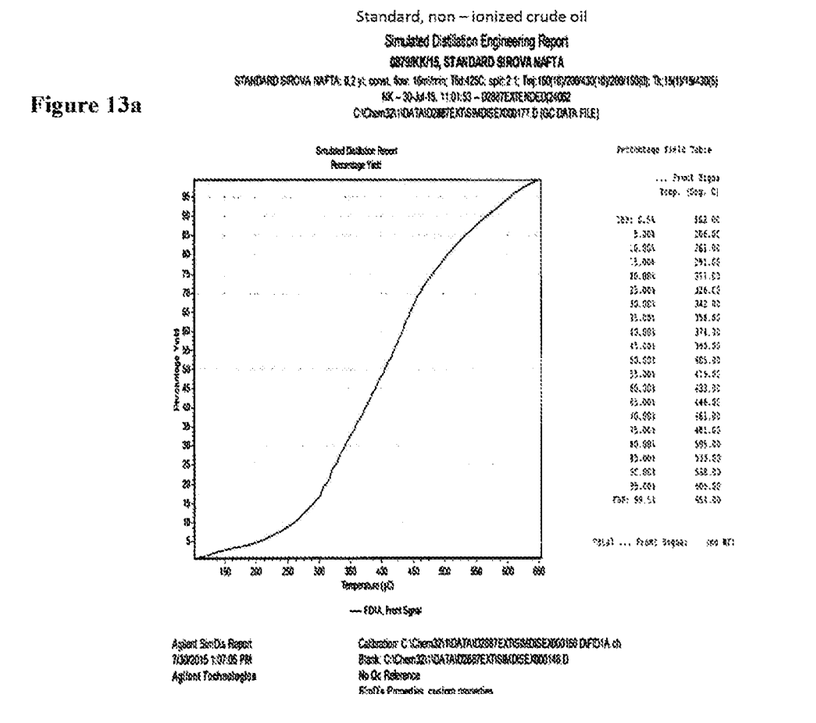
Figure 13B:
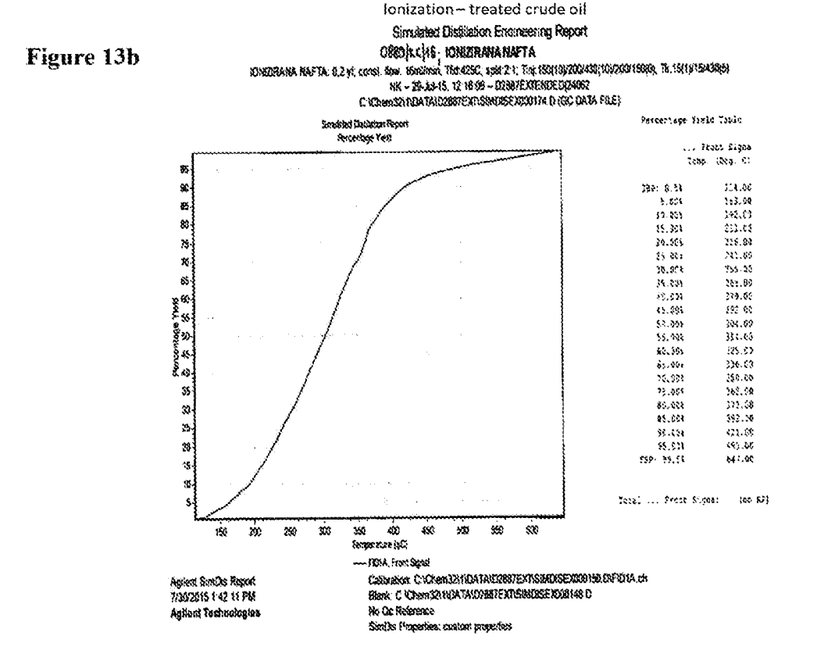
FIG. 13b presents data regarding a simulated distillation of ionized crude oil.

The data received indicate that no significant changes exist in the scope of simulated distillation for the ionized sample of crude oil in comparison with the standard sample of crude oil, meaning that the specific ionization method does not cause changes in the chemical composition of crude oil. Certain deviations can be explained as the fact that ionization has been conducted in an open system, resulting in the infinite loss of highly volatile substances from the crude oil.

Figure 14:
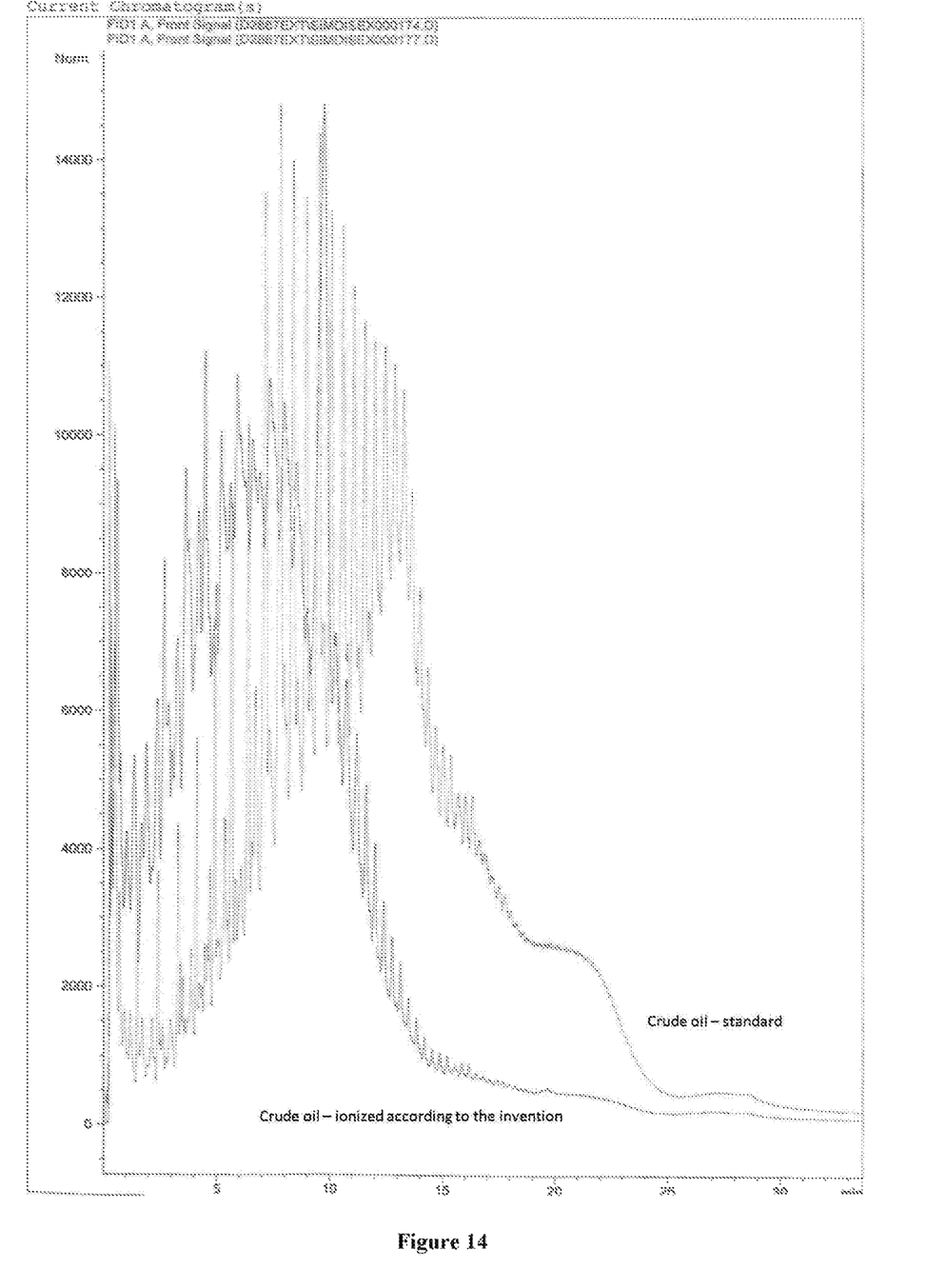
FIG. 14 presents a chromatogram for standard crude oil and ionized crude oil.

The chromatograms show certain structural changes. The chromatogram for crude oil processed with the ionization method does not have peaks in the area of the number of carbon atoms that are larger than 20. This indisputably confirms the change of the pour point of crude oil.

Determining the Group Composition

|  | Ionized crude oil (% m/m) | Standard crude oil (% m/m) |
| --- | --- | --- |
| Total aromatics | 18.24 | 20.26 |
| Total paraffins | 77.28 | 79.74 |

Figure 15A:
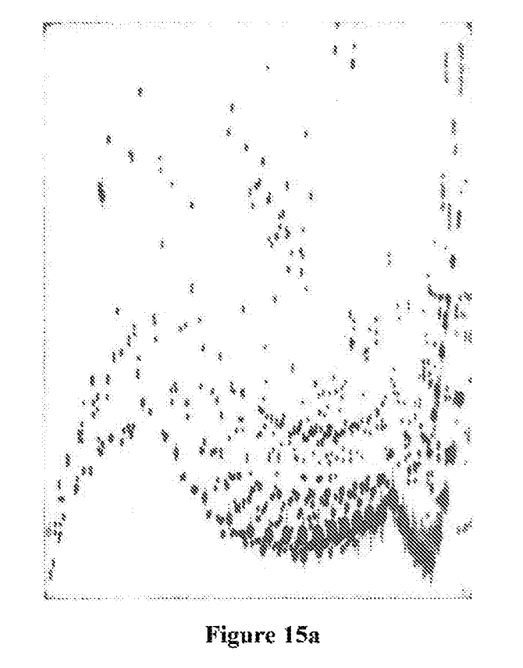
Figure 15B:
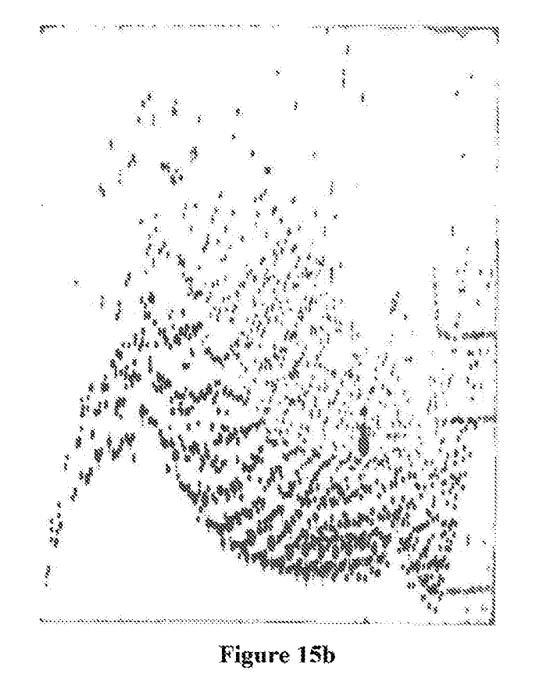
FIG. 15b presents an H NMR spectrogram for ionized crude oil.

Two-dimensional gas chromatography has been conducted to prove that no significant changes in the structural preparation from the sample exist, i.e. to prove that the ratio of aromatics and paraffins remains the same after treatment using ionization. This also shows that treatment using the device according to the present invention does not affect the composition of crude oil, but only the physical characteristic of the flow property. The stated is also shown by $H^1NMR$ spectroscopy.

Chromatograms show that natural untreated crude oil contains accumulations of certain structural groups of paraffins, cycloparaffins, isoparaffins, aromatics and polyaromatics. On the other hand, according to the chromatogram of the sample of crude oil that has been treated with the device according to this present invention, the above-mentioned structural groups are dispersed, meaning that it is possible to separate them easier. This is also direct evidence that this device has a direct impact on lowering the pour point of crude oil.

The described device for treating crude oil or heavy fuel oil using a specific ionization method represents a device that can be manufactured economically and easily using simple manufacturing processes, and also can be easily disassembled and assembled, providing a unique device that can result in large savings during transport of such ionized crude oil or heavy fuel oil. Experts will find it obvious that it is possible to make numerous modifications and changes to this device for the treatment of crude oil or heavy fuel oil using ionization according to this present invention without abandoning the scope and essence of the invention.

For clarification purposes, the following reference designations have been introduced, which have been used in the text of the description of the present invention and its figures:

1. heating chamber
2. main ionization device
3. lateral U couplings
4. inlet tube of the device
5. outlet tube of the device
6. tube nut
7. inlet tube
8. outlet tube
9. inlet manometer
10. inlet pressure regulator
11. outlet manometer
12. outlet pressure regulator
13. bypass tube
14. elbow joint
15. inlet valve
16. bypass valve
17. electric heater
18. neutral
19. active
20. inlet flow gauge
21. inlet temperature gauge
22. outlet flow gauge
23. outlet temperature gauge
24. wire
25. screw of ground potential
26. straight connecting tube
27. door screw
28. controller
29. heating chamber thermostat
30. heating chamber thermostat
31. flow gauge contact
32. temperature gauge contact
33. outlet flow gauge contact
34. outlet temperature gauge contact
35. heating chamber thermostat
36. heating chamber thermostat
37. controller carrier
38. heater nut
39. nut of the inlet tube of the device
40. nut of the outlet tube of the device
41. left half of the inlet separator
42. right half of the inlet separator
43. left half of the outlet separator
44. right half of the outlet separator
45. main carrier of ground potential
46. exterior carrier of ground potential
47. ground potential carrier screws
48. insulator
49. protective copper tube
50. nut
51. left door
52. right door
53. metal leg
54. coupling
55. coupling thread
56. O ring
57. flange
58. flange thread
59. exterior male flange thread
60. elongated face of the coupling
61. lateral openings of the elongated face of the coupling
62. thread of the right half
63. juncture of left half
64. outer thread of half
65. inner thread of half
66. thread of the left half of the outlet separator
67. juncture of the right half of the outlet separator
68. spring
69. internal core
70. external core
71. copper housing
72. thread of the outer tube's connecting couplings
73. insulating shell
74. elongated coupling tube
75. hemispherical protrusions
76. cable lug
77. opening
78. thread on right side of insulator
79. thread on left side of insulator
80. copper tube
81. inner tooth
82. outer tooth
83. opening
84. screw
85. segment of ionization device

The invention claimed is:

1. A device for lowering a pour point of crude oil or heavy fuel oil and bunker fuel using a specific ionization method, and the method is conducted by passing heated crude oil or heavy fuel oil through a main ionization device, which is grounded and which comprises three parallelly connected segments whereby each segment comprises a protective copper tube inside which a protective insulating shell is situated, inside which a copper housing is situated, and in each copper housing there is one cylindrical-shaped external core in which an internal core is placed, and the external core and internal core are manufactured as two different alloys by composition wherein the alloy of the internal core is of the following composition:

| Component | by weight (%) |
|---|---|
| aluminum | 1.94 |
| copper OFHC99.92 | 54.00 |
| tin, 99.9% purity | 1.80 |
| zinc, 99.9% purity | 22.10 |
| antimony | 0.05 |
| iron | 0.08 |
| nickel | 11.74 |
| lead | 8.00 |
| gold | 0.05 |
| silver, 90% purity | 0.04 |
| tungsten | 0.01 |
| vanadium | 0.02 |
| phosphorus | 0.02 |
| sulfur | 0.02 |
| silicon | 0.06 |
| manganese | 0.04 |
| platinum | 0.03 | and wherein the alloy of the external core is of the following composition:

| Component | by weight (%) |
|---|---|
| aluminum | 2.40 |
| copper OFHC99.92 | 52.73 |
| gold | 0.05 |
| antimony | 0.06 |
| zinc, 99.9% purity | 22.80 |
| silver | 0.04 |
| tin, 99.9% purity | 1.80 |
| chromium | 0.04 |
| nickel | 11.74 |
| cobalt | 0.05 |
| tungsten | 0.01 |
| vanadium | 0.02 |
| lead | 8.00 |
| iron | 0.08 |
| phosphorus | 0.05 |
| sulfur | 0.02 |
| manganese | 0.04 |
| silicon | 0.03 |
| platinum | 0.04. |

2. The device according to claim 1, wherein the main ionization device contains at least three main ionization segments that are interconnected parallelly, and each ionization segment individually comprises a protective copper tube inside which a protective insulating shell is located, in which the copper housing and external core and internal core are situated.

3. The device according to claim 1, wherein at least 6 ionization devices are serially connected, each of which comprises three main ionization segments in order to lower the pour point of crude oil or heavy fuel oil to 0° C., and therefore remain at that temperature for at least one year.

4. The device according to claim 1, wherein the length of one internal core and external core of the ionization segment does not exceed 28.5 cm, and an increase in the capacity of the device is realized by increasing a cross section of the core.

5. The device according to claim 1, wherein the internal core has the shape of a trapezoid thread in order to achieve maximum contact of the medium over the area of the cores by friction.

6. The device according to claim 5, wherein the internal core has a starting left trapezoidal thread, and after ¼ of the length of the core, the core is converted to a right trapezoidal thread, which after ⅔ of the length of the core once again coverts to a left trapezoidal thread, and at the final ¼, the core again converts to a right trapezoidal thread.

7. The device according to claim 5, wherein the internal core has a starting right trapezoidal thread, and after ¼ of the length of the core, the core is converted to a left trapezoidal thread, which after ⅔ of the length of the core once again coverts to a right trapezoidal thread, and at the final ¼, the core again converts to a left trapezoidal thread.

8. The device according to claim 1, wherein the external core has a cylindrical shape with a lengthwise bore through its axial length, which has hemispherical protrusions on its inside rim in order to additionally increase the turbulence of the medium in the device and its friction over the area of the cores.

9. The device according to claim 8, wherein the external core has on its inside four main rows of 56 hemispherical protrusions arranged at 90° and between every two of the four primary rows, an additional row of 48 hemispherical protrusions is situated; the first additional row is positioned at 45°, the second at 135°, the third at 225°, and the last additional row at 315°.

10. The device according to claim 1, wherein the composition of the insulating shell is such that it contains 50% polyamide and 50% fiberglass.

11. The process of obtaining ionized liquid crude oil or heavy fuel oil using the device according to claim 1, wherein the preferred inlet pressure of the liquid crude oil or heavy fuel oil is at least 25 bars, and optimal ionization is achieved at a temperature of approximately 90° C. at a pressure of 25 bars.

12. The process of obtaining ionized liquid crude oil or heavy fuel oil according to claim 11, wherein for temperatures of the inlet medium that are lowered for each 10° C., the ionization assembly is extended by one additional ionization device, which comprises three main parallelly connected segments, while the inlet pressure of the medium for each 10° C. decrease in temperature must be increased by 2 bars.

13. The device for lowering the pour point of crude oil or heavy fuel oil according to claim 1, wherein the service is used directly on oil wells for the production and transportation of crude oil or heavy fuel oil, in refineries for the production and transportation of crude oil or heavy fuel oil, and for the storage of crude oil or heavy fuel oil.

14. The device according to claim 2, wherein at least 6 ionization devices are serially connected, each of which comprises three main ionization segments in order to lower the pour point of crude oil or heavy fuel oil to 0° C., and therefore remain at that temperature for at least one year.

* * * * *